Patented May 11, 1937

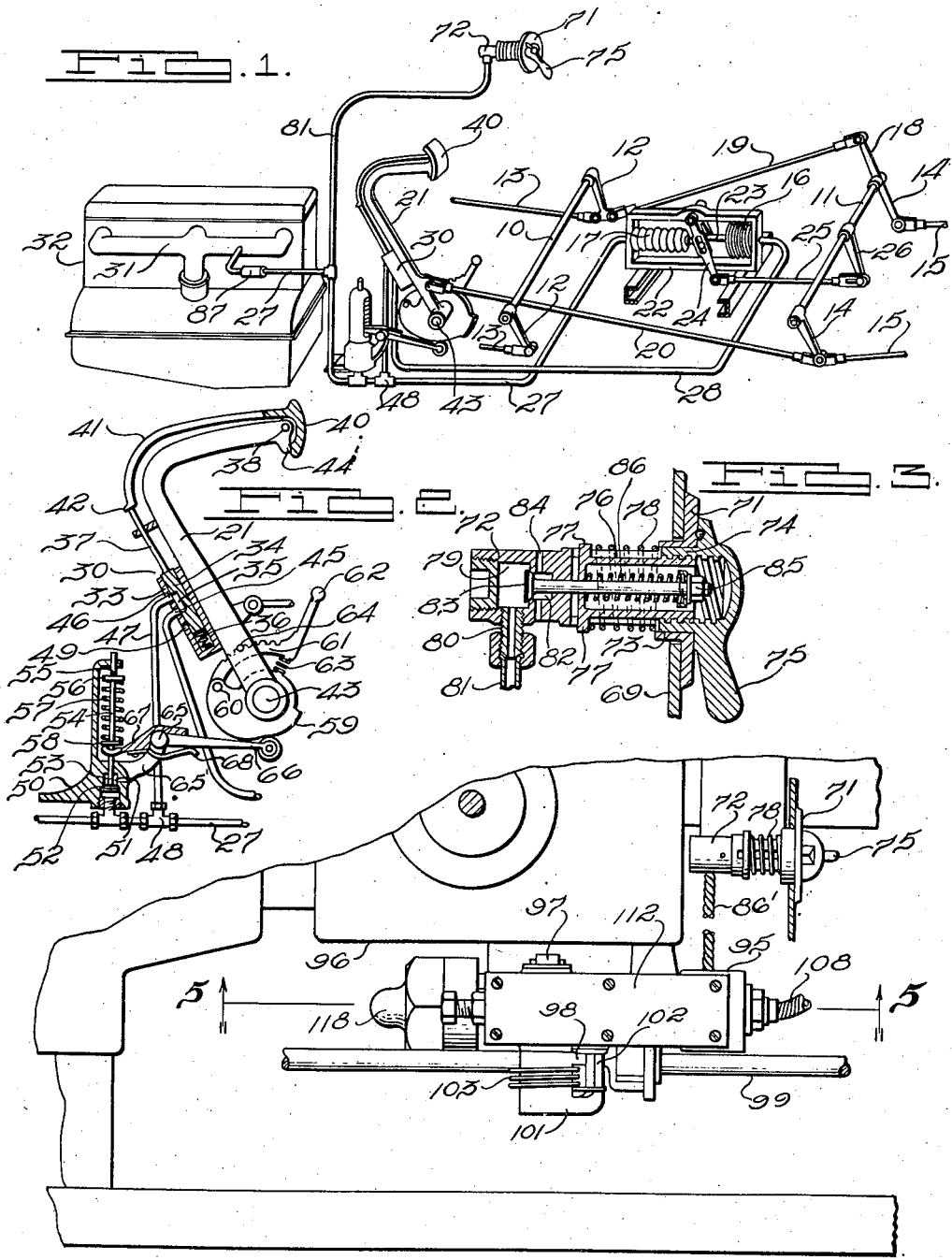

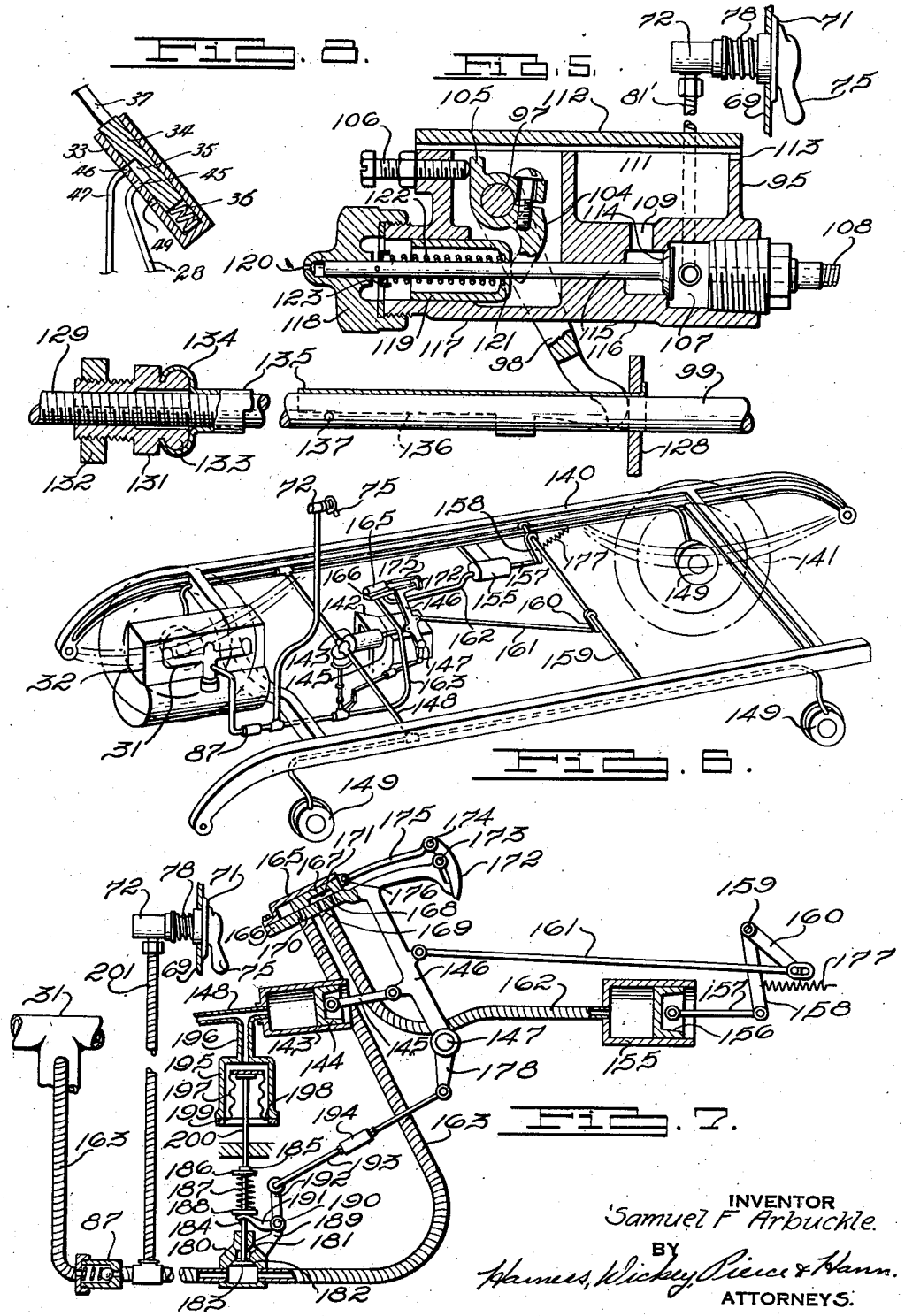

2,079,588

UNITED STATES PATENT OFFICE 2,079,588

BRAKE MECHANISM

Samuel F. Arbuckle, Highland Park, Mich., assignor to S. F. Arbuckle Corporation, a corporation of Delaware Application December 22, 1932, Serial No. 648,510

6 Claims. (Cl. 188—152)

This invention relates to brake mechanism and more especially such mechanism as employs suction actuated means for aiding in the application of the brakes, and is an improvement on the constructions shown in the application for Letters Patent of the United States for improvements in Brake mechanism of the present applicant and Andrew L. Vargha, filed April 2, 1928, Serial No. 266,551, and in Letters Patent of the United States, No. 1,834,368, for Braking mechanism, issued to the present applicant, December 1, 1931.

The principal object of the present invention is to improve the construction and control of the above types of brake mechanisms.

Another object is to provide, in combination with a brake system and booster mechanism therefor, means controlled by suitable operation of the brake pedal for varying the amount of brake pressure which the booster mechanism may exert upon the braking system and means controlled independently of the brake pedal for limiting the amount of such braking pressure.

Another object is to provide automatically adjusted means and independent manually adjustable means for controlling and limiting the effective power application of vacuum operated brakes.

Another object is to utilize the higher values of vacuum developed within the intake manifold of a vehicle motor in the operation and control of the booster system.

A further object is to arrange mechanisms for controlling and limiting the power application of suction operated brakes so as to insure quick action of such mechanisms.

Other objects and advantages will become apparent from the following description and apparent claims taken in connection with the accompanying drawings which, for the purpose of illustrating the invention, depict several concrete embodiments thereof.

In the drawings:

Figure 1 is a more or less diagrammatic fragmentary perspective of one arrangement of suction operated power means for actuating the brakes of a vehicle and the control mechanism for such means, Fig. 2 is a more or less diagrammatic vertical section taken centrally through the control mechanism shown in Fig. 1, and illustrates manually adjustable and automatic means for varying the effect of the power operated means shown in Fig. 1, Fig. 3 is a vertical section taken longitudinally through the center of a manually controlled member for controlling the effective pressure that may be applied to the power members in vacuum operated brakes, Fig. 4 is a top plan of a modified form of the control mechanism shown in Fig. 2, such mechanism being shown as supported on the transmission of a motor vehicle, Fig. 5 is a vertical section taken on line 5—5 of Fig. 4, Fig. 6 is a more or less diagrammatic perspective of a portion of an automobile chassis showing the application of a booster mechanism and control apparatus therefor to a hydraulic brake system, Fig. 7 is a more or less diagrammatic vertical section of the booster mechanism and control apparatus therefor shown in Fig. 6, and Fig. 8 is an enlarged detail of the valve mechanism shown in Fig. 2.

In the application of power operated brake mechanisms to motor vehicles, it is desirable to permit the maximum braking effort that may be applied by the braking means to be easily and quickly varied, whereby an excessive power application of the brake will be prevented under conditions where such excessive application is hazardous such as, for instance, on wet or icy roads. The present invention contemplates the provision of a manually controlled mechanism, whereby the maximum braking effort that may be applied, by so-called vacuum or suction operated brake mechanisms may be easily and quickly adjusted so as to prevent the wheels from locking under varying conditions of road surface. The invention also contemplates the provision of novel forms of control means for controlling the application of such power actuated braking means, the advantages resulting from which will be apparent from the following description and explanation. The present invention further contemplates the provision of a braking system which, by means of its construction, lends itself to application to various requirements as to braking effort without change in construction of the various parts making up the power system, which is commercially desirable. The invention further contemplates the provision of means for utilizing the higher values of vacuum developed in the engine intake manifold in the operation and control of the booster system employed in conjunction with the braking system and further contemplates the provision of means for limiting the application of the power actuated braking means so arranged as to provide quick action of such limiting and controlling means.

Referring to the drawings, and particularly to Fig. 1, a brake mechanism applicable to motor vehicles is shown as comprising a front cross shaft 10 and rear cross shaft 11. The front cross shaft 10 is provided at each end with a downwardly extending arm 12, each of which is connected by a rod 13 to the brake on the corresponding front wheel (not shown) of the vehicle on which the mechanism is mounted. The rear cross shaft 11 is provided with a downwardly extending lever 14 at each end thereof and each lever 14 is connected by a rod 15 to the brake on the corresponding rear wheel (not shown) of the motor vehicle. The shaft 11 is also provided with an upwardly extending lever 18 which is connected by a rod 19 to one of the levers 12 on the front cross shaft 10 so that rocking of one of the shafts 10 or 11 will cause a corresponding rocking movement of the other shaft. The free end of one of the levers 14 is connected by a rod 20 to the foot operated pedal 21 which will be described later more in detail. Upon depression of the pedal lever 21, the shaft 11 is caused to rock and causes a like rocking movement of the shaft 10 and consequent manual application of all of the brakes.

In the provision of power means for applying the brake, two bellows 16 and 17 are employed, the bellows 16 being considerably larger in diameter than the bellows 17. Both bellows are mounted in a rigid frame 22, at opposite ends thereof, and their adjacent ends are connected by a rod or other member 23 so that their free ends are constrained to equal movement. A lever 24 pivotally mounted to the upper edge of the frame 22 is slidably connected intermediate its length to the rod 23 and its free end is connected by the rod 25 to the lever 26 secured to the shaft 11, the connection between the rod 25 and lever 26 being of the lost motion type. The interior of the bellows 17 is in constant communication with a source of suction through the conduit 27 and the interior of the bellows 16 is connected by the conduit 28 to a control mechanism mounted on and controlled by the foot pedal 21, the control mechanism being indicated generally at 30 and being connected to a suitable source of suction such as the intake manifold 31 of the internal combustion engine 32. In this construction, both bellows 16 and 17 are normally held under a suction or partial vacuum when the brakes are in inoperative position, the effect of this is that the vacuum being equal in both bellows, the larger bellows 16 collapses and overcomes the collapsing tendency in the smaller bellows 17, causing the smaller bellows to be held in extended position even though it is under a partial vacuum. In this position the brakes are held in inoperative position and when the control mechanism 30 is suitably actuated, air is admitted to the larger bellows 16 which thereby breaks the vacuum in the same and permits it to expand and the smaller bellows 17 to contract, thus moving the connecting member 23 forwardly and rocking the lever 24, which rocking movement is transmitted by the rod 25 and lever 26 to the shaft 11 and causing subsequent application of all the brakes. The advantage of this mechanism is that a quick application of the brakes may be obtained by dumping a large amount of air into the large bellows without dumping a similar amount of air into the intake manifold which might interfere with carburetion of engine 32.

Upon release of the control mechanism 30, as will be hereinafter described, the large bellows 16 is again connected to the suction source and is caused to collapse, thus releasing the brake.

Referring more particularly to Figs. 2 and 8, there is shown in greater detail the control mechanism for the bellows 16 and 17 illustrated in Fig. 1. The control mechanism, designated generally at 30, as above indicated, comprises a housing 33 mounted on the forward face of pedal lever 21 and closed at its lower end. Slidably received within the housing 33 is a sliding member 34 having a passage 35 therein. A spring 36, held in compressed condition between the lower end of the member 34 and the closed end of the housing, normally urges the member 34 upwardly. The member 34 is provided with a stem 37. A pedal pad 40 is pivotally mounted at 38 on the free end of the pedal lever 21 and is provided with an extension 41 which terminates in a foot 42 arranged to slidably engage the free end of the stem 37. The lever 21 may be rocked about its shaft 43 without rocking the pad 40 if this pad is held by pressure applied to the lower edge thereof against a stop 44 on lever 21, or pad 40 may be rocked without rocking the lever 21 on the shaft 43, or the pad 40 may be rocked simultaneously with the lever 21. If the pedal pad 40 is rocked by pressure applied to the upper edge of the same, the foot 42 will be moved in the general direction of the axis of stem 37 and will act through this stem to urge the member 34 downwardly into the housing 33 against the pressure of the spring 36. When the member 34 is in normal inoperative position in the housing 33, the passage 35 is connected by a passage 45 in the wall of the housing 33 with a conduit 28 which leads to the interior of the larger bellows 16. The passage 35 is also connected by a passage 46 with the conduit 47 which leads to a fitting 48 interposed in the suction line 27. Suction line 27, as previously pointed out, extends between the interior of the smaller bellows 17 and a source of suction such as the intake manifold 31 of internal combustion engine 32. With the pad in released position as indicated in Figs. 1 and 2, both bellows 16 and 17 are subjected to the suction of the system and the larger diameter bellows 16 is in collapsed condition effecting the release of the brakes. When the member 34 is moved downwardly in the housing 33 the passage 35 is connected with a passage 49, communicating between the interior of the housing and the atmosphere, so that the interior of bellows 16 is open to the atmosphere through conduit 28 and passages 35 and 49. The admission of air to the bellows 16 allows this bellows to expand while the bellows 17 still communicates with the suction system and is caused to collapse thus applying the brakes.

The braking power developed by the suction in the above manner may be augmented by manually pressing the brake pedal 21 forwardly while the pad 40 is held in its tilted position relative to the pedal lever. When the brake pedal is released the pad 40 is rotated to its initial position against stop 44 by the action of spring 36, the foot pedal returning to its normal rearward position illustrated. The spring 36, in returning the pad 40 to its retracted position, moves the valve 34 upwardly, cutting off the admission of air to the bellows 16 and subjecting both bellows 16 and 17 to the suction of the system.

In order to prevent an excessive application of the booster mechanism to the brakes, and to control the amount of force exerted by the booster mechanism in accordance with the relative position of the brake pedal, the following mechanism is provided.

A small housing 50 is connected into the suction line 27 between the fitting 48 and the intake manifold 31, so as to be equally applicable to both bellows 16 and 17. This housing is provided with an opening 51 leading to the atmosphere, and between the opening 51 and the point of entrance to the suction line 27 into the housing 50, a valve seat 52 is formed. A valve 53 is adapted to rest against the seat 52 and is provided with an upwardly extending stem 54. Adjacent its top the stem is provided with a pin 55 secured against relative axial movement with respect to the stem and against which a washer 56 bears. A coil spring 57 encircles the stem 54 and is held under compression at all times between the washer 56 and a second washer 58 encircling the stem 54 and axially slidable thereon. It will be apparent that further compression of the spring 57, through pressure applied to washer 58, controls the point at which the suction within the line 27 will cause the valve 53 to open, and that the valve 53 upon opening will allow air to be drawn into the housing through the opening 51 and thereby prevent a higher degree of suction from being built up in the suction line 27, and consequently will limit the suction that may be applied to either or both of the bellows 16 and 17.

The compression of the spring 57 is controlled in the following manner. A cam 59 is rotatably mounted on the shaft 43 adjacent one side of the lever 21. Pivotally connected to the cam 59 by the pin 60 is a ratchet segment 61 provided with a manually engageable lever 62. The free end of the segment 61 is normally urged outwardly by a coil spring 63 held under compression between the same and the cam 59. The lever 21 is provided with a pin 64 which is adapted to engage one of the teeth on the ratchet member 61 thereby locking the cam 59 in rotatably adjusted position relative to the lever 21. The rotatable position of the cam 59 relative to the lever 21 may be varied by depressing the arm 62 so as to compress the spring 63 thereby drawing the segment 61 out of engagement with the pin 64 after which the cam may be rotated to the desired position and the arm 62 released, causing the segment to again engage the pin 64. Pivotally mounted at 65 on a bracket 65' extended from the housing 50 are a pair of oppositely extending levers 66 and 67, the free end of lever 66 being normally held against the cam 59 and the free end of the lever 67 supporting the washer 58 on the valve stem 54. A flat spring 68 secured to the lever 67 contacts with the lever 66, and upon clockwise rotation of the lever 66 about the pin 65, urges the lever 67 to a like movement but permits the lever 66 to move independently of the lever 67 when sufficient pressure is exerted on the free end of the lever 67 to overcome the force of the spring 68. The cam 59 provides a cam surface so arranged that as the pedal 21 is depressed, the free end of the lever 66 is moved downwardly thus moving the free end of the lever 67 and the washer 58 upwardly and tending to compress the spring 57 so that a greater suction must be present in the bellows 16 and 17 before the valve 53 will lift and limit such suction. This provision of means for manually adjusting the rotatable position of the cam 59 permits the adjustment of the mechanism so that a predetermined movement of the lever 21 will always exert a predetermined braking pressure on the brakes regardless of the amount of wear on the brake bands. As the brake bands wear the cam 59 may be shifted to compensate for such wear.

Referring particularly to Figs. 1 and 3, manually adjustable means provided for limiting the amount of braking effort which the bellows 16 and 17 may apply in order to correspond with the condition of the road surface over which the vehicle may be traveling, will be described. This means may be in the form of a suction operated regulating valve, which may be mounted on the instrument panel, dash, or other suitable supporting surface 69 of a motor vehicle, in a position to be readily accessible to the operator. In the preferred construction of this valve, a flange-like member 71 is provided with a rearwardly extending body portion 72 provided with an opening 73 at its forward end which opens on the face of the flanged portion 71 and in the forward end of which is rotatably received the sleeve 74 of the handle 75. A portion of the wall of the body portion 72 surrounding the opening 73 is removed, as indicated in Fig. 3, and received within the opening 73 is a sleeve member 76, the forward end of which threadably engages the inner surface of the sleeve portion 74 of handle 75. The sleeve 76 is provided with a pair of outwardly projecting fingers 77 which prevent rotation of the sleeve 76 in the opening 73 and also serve as abutments for the spring 78 held under compression between such abutments and the shoulder formed by cutting away a portion of the wall of the member 72. Thus, by turning the handle 75, the sleeve 76 is caused to move axially either one way or the other, depending upon the direction of rotation of the handle 75. The rear end of the body portion 72 is provided with a chamber 79 formed by drilling out the same and then plugging it. The chamber 79 may be connected by a connection 80 and conduit 81 with the suction line 27 extending between the brake-applying bellows and the source of suction previously described. The body 72 is also provided with a chamber 82 connected with the chamber 79 and normally closed by the valve 83. The chamber 82 is connected with the atmosphere through passages 84. The stem of the valve 83 slidably extends into the opening 73 through the closed end of the sleeve 76 and is provided at its free end with a nut 85. A coil spring 86 is held under compression about the valve stem between the nut 85 and the closed end of sleeve 76. When the suction within the conduit 81 and suction line 27 becomes sufficiently great, the valve 83 is lifted from its seat, thereby admitting air into the conduit 81 through the passages 84 and the chambers 82 and 79 and preventing greater suction from being obtained than that for which the regulating valve is set. The degree of suction necessary to lift the valve 83 from its seat is, of course, controlled by the compression of the spring 86 and this compression is, in turn, controlled by the relative position of the closed end of the sleeve 76 with respect to the nut 85. Inasmuch as this relative position of the closed end of the sleeve 76 is controlled by the rotative position of the handle 75, it is readily apparent that by rotating the handle 75, the amount of suction which may be applied to operate the brakes may be controlled. Thus, by rotating the handle 75 in one direction, the compression of the spring 86 will be decreased, thus permitting the valve 83 to unseat at a relatively small value of suction in the conduit 81 and suction line 27, and thereby limits the amount of braking effort which may be applied by the connected bellows 16 and 17 to a relatively small amount, such as, for instance, an amount commensurate with that necessary to apply the brake of a motor vehicle on an icy pavement without causing the wheels to slide. Conversely, if the handle 342 is rotated in a reverse direction, the spring 86 will be placed under a greater tension which will consequently allow a greater suction to be built up in the conduit 81 and in the suction line 27 before the valve 83 lifts and limits the degree of suction. In this manner, the effective maximum braking effort which may be applied to the brake by the bellows may be easily, quickly and readily controlled by simply rotating the handle 75 to the desired position in order that the braking effort of the braking mechanism may be varied to correspond with the condition of the road surface over which the vehicle may be traveling. A check valve 87 is inserted in the suction line 27 adjacent the manifold 31. This valve may be of any conventional design and serves to maintain the suction within the booster system at a higher average level than would be obtained if the suction system of the booster mechanism were constantly in direct communication with the intake manifold. As the speed of engine 32 increases up to a certain point, the suction within intake manifold 31 also increases, but this suction drops off as the speed of the engine increases above this point. By providing the check valve 87 within the suction line adjacent the intake manifold 31, the value of the suction within the suction system of the booster mechanism is maintained at a level approximately equal to the maximum value of suction produced within the intake manifold. Thus, more efficient and more constant operation of the booster mechanism are obtained.

It is also to be noted that in the above construction the means for limiting the maximum available braking effort that may be applied by the booster mechanism, which includes the valve 83 contained in housing 72 connected by conduit 81 to the suction line 27 and the means for controlling the braking effort which may be applied by the booster mechanism in accordance with the depression of pedal lever 21, which includes the valve 53 contained in housing 50 connected to the suction line 27, are both connected to or in the suction line at points adjacent the intake manifold of the engine but between the check valve 87 and the bellows 16 and 17. By connecting these control units adjacent the source of suction, the control units will accurately determine the braking effort which may be applied by the booster mechanism at all times regardless of any leakage or other causes of loss of suction within the suction system of the booster mechanism.

Referring particularly to Figs. 4 and 5, a control device similar in effect to the control device shown in Fig. 2, for controlling the degree of suction or vacuum on the brake operating bellows, is illustrated. In this construction, a housing member 95 is shown secured to the side of the transmission housing 96 of a motor vehicle, although it may be secured to any other suitable supporting member. The housing 95 is provided with a cross shaft 97 which rotatably receives thereon the lever 98, the lower end of which is yoked and on which is slidably received the rod 99, which may correspond to the rod 20 shown in Fig. 1 and which is connected to the brake pedal, or may be any other rod pivotally or otherwise secured relative to the brake pedal so as to be given axial movement upon depression of the brake pedal. Secured against relative rotation to the shaft 97 on the outside of the housing 95 is an arm member 101, the arm 102 of which is bent inwardly, as illustrated in Fig. 4, and normally held against the arm 98 by means of a coil spring 103. Within the housing 95 and secured against relative rotation, is a third lever 104 provided with a yoked lower end. A lever 104 is provided with a finger 105 which is adapted to engage the adjustable screw 106 in order to limit the movement of the lever 104 in one direction. The housing 95 is provided with a chamber 107 which is connected by the conduit 108 to any one of the passages between the suction source and the brake operating bellows. Preferably the conduit 108 connects the chamber 107 as close to and as directly to the source of suction as possible. The chamber 107 is connected by passage 109 to a chamber 111 in the housing 95 which is closed by a cover 112 and is connected to the atmosphere through the opening 113. Communication between the chambers 107 and 111 is normally prevented by means of a valve 114. A stem 115 of valve 114 extends through a wall 116 of housing 95 and is positioned centrally of the forwardly extending cylindrical portion 117 of the housing 95. The stem 115 passes through the lower yoked end of the lever 104 and extending forwardly from the valve 114. The forward end of the cylinder 117 is closed by a fitting 118 which is centrally bored to provide a guide for the valve stem 115, the guide opening being vented at 120 so that pressure within the guide opening will not interfere with the seating of valve 114. Slidably received within the cylinder 117 is a sleeve 119 which is partially closed at one end as indicated at 121. The coil spring 122 is held under compression between the end 121 of sleeve 119 and a washer 128 held against axial movement of the stem 115. The spring 122 is maintained under compression between the end 121 of sleeve 119 and the washer 123 by the forked end of lever 104 so that the spring 122 tends at all times to maintain the valve 114 in closed position.

The rod 99 is provided with a stop member 128 against the forward face of which the yoked end of the lever 98 normally bears. The stop member 128 may be fixed against movement relative to the rod 99 and is preferably adjustably fixed axially of the rod. To adjustably fix the position of stop member 128 axially of the rod 99, a portion of the rod 99, at a point where it is easily accessible, is threaded as indicated at 129. A split nut 131 threadedly engages the portion 129 and may be locked in adjusted position by the lock nut 132. The nut 131 is provided with a splined portion 133 which is rotatably received within a similarly shaped end 134 of the sleeve 135 which encircles the shaft 99 and extends to and is secured to the stop member 128. Relative rotation of the sleeve 135 with respect to the rod 99 may be prevented by removing substantially half of the sleeve 135 for a material distance as indicated at 136 and inserting a pin 137 through the rod 99 so as to bear against the cut-away edges of the sleeve 135. By loosening the nut 132 and rotating the split nut 131, the axial position of the stop member 128 on the rod 99 may be easily and quickly adjusted.

In the operation of the control device shown in Figs. 4 and 5, as thus far described, it will be apparent that when the brake pedal is depressed, the rod 99 is moved to the left and carries the stop member 128 with it. The stop member 128 acting against the end of the lever 99 rotates this lever and the brake 103 urges the lever 101 to follow the movement of the same. When the lever 101 thus follows the movement of the lever 98, the shaft 97 and arm 104 move in accordance with the movement of the lever 101 and the yoked end of lever 104 bearing against the closed end 121 of sleeve 119 moves this sleeve forwardly or to the left, further compressing the spring 122. When the compression of spring 122 is thus increased, the suction within the chamber 107 necessary to lift the valve 114 and release such suction, is increased accordingly. Upon continued movement of the rod 99 to the left, the arm 104 will continue to move the sleeve 119 until it comes in contact with the fitting 118 and prevents further compression of the spring 122. Any further movement of the lever 98 merely flexes the spring 103, the arm 102 of the lever 101 moving out of contact with the lever 98. It will thus be apparent that any movement of the rod 99 to the left has the effect of increasing the amount of suction which may be built up in the brake operating bellows and that the maximum amount of pressure which may be built up in such bellows is ultimately controlled by the axial position of the sleeve 119. It will also be apparent that by adjusting the position of the stop member 128 axially of the rod 99, the point at which increase in the compression of spring 122 begins, may be controlled. Means for limiting the maximum effort which may be applied to the brakes by the bellows is provided and preferably takes the form of a suction operated valve such as that disclosed in Fig. 3. The housing 72 of such vacuum operated valve is connected to the chamber 107 by means of a conduit 81'. The degree of suction required to operate this valve may be controlled by rotating the handle 75 to the desired adjusted position so that the suction operated valve may be easily and quickly controlled by the operator of the vehicle. The conduit 108 communicates between the chamber 107 and a point in the suction line of the booster system adjacent a check valve 87 in a manner similar to that disclosed in Fig. 1. Thus, both the valve 114 in housing 116 and the suction operated valve in housing 72 are subjected to the suction within the suction line at a point adjacent the check valve so that quick operation of the control and limiting devices are obtained regardless of any leakage which may occur further back in the vacuum system.

Referring particularly to Figs. 6 and 7, there is shown the preferred arrangement of the present invention as employed in connection with a hydraulic braking system for a motor vehicle. In these figures, a conventional motor vehicle chassis frame 140 is provided with the usual wheels 141. Mounted upon the engine transmission housing 142 is a cylinder 143 usually known as the master cylinder, in which is received a piston 144, which is connected by a link 145 to the brake pedal 146 suitably mounted as upon the shaft 147 for oscillating movement. The master cylinder 143, which may be of any conventional design, is connected to tubes such as 148 to the brake mechanism, indicated generally as 149 mounted for cooperation with each of the wheels 141. The brake mechanism 149 may take any of the conventional forms of mechanism of this type. In conventional operation, when it is desired to apply the brakes, the foot pedal 146 is depressed, thereby moving the piston 144 in the cylinder 143 and causing the liquid therein to be forced through the tubes 148 to the various brake mechanisms 149 and there apply pressure to cause application of the brake mechanisms.

It will be apparent that the amount of pressure that it will be possible to apply to the various brake mechanisms 149 will depend entirely upon the amount of pressure that is applied to the foot pedal 146, the diameter of the cylinder 143 and the relative distance between the shaft 147 and the point of connection of the link 145 with the pedal 146, as well as the effective length of the pedal 146. For practical reasons this pressure is necessarily limited, and where such hydraulic braking systems are applied to motor vehicles of the truck or bus type, it is usually desirable, in order to obtain the braking effort desired, to provide means for applying a greater pressure to the liquid in the braking system than is possible solely by foot pressure. Accordingly, a so-called vacuum booster mechanism may be employed to assist in the application of the brake mechanism.

This booster mechanism may include a cylinder 155 which may be suitably mounted on the chassis frame 140 and in which cylinder a piston 156 is received. The piston 156 may be connected by a link such as 157 and lever arm 158 to a cross shaft such as 159 journaled at its ends in the opposite sides of the frame of the chassis, designated 140. The shaft 159 in turn may be connected to the pedal 146 through a lever arm such as 160 and link 161. The interior of the cylinder 155 is connected to conduits 162 and 163 to the intake manifold 31 of the internal combustion engine 32 which forms the motive power for the vehicle. A valve mechanism is inserted between the conduits 162 and 163 in order to control the application of the suction from the intake manifold to the cylinder 155. This valve, shown in detail in Fig. 7, comprises a housing 165 carried on an extension 166 of the foot pedal 146 in which a valve member 167 is slidably received. Extension 165 is provided with openings 168, 169 and 170 therein, the conduit 162 being connected with the opening 169, the conduit 163 being connected with the opening 170 and the opening 168 being connected with the atmosphere. The valve 167 has a recess 171 in its lower side which bridges the openings 168 and 169 so as to connect the interior of the cylinder 155 with the atmosphere when the valve is in an inoperative position. The valve 167 is controlled by a pad member 172 pivotally mounted on the foot pedal 146 at 173 and pivotally connected at 174 with a link 175 which is pivotally attached to a valve 167 at 176.

The pad 172 may be rocked about the pivot 173 independently of the movement of the foot pedal 146 to control the application of the booster mechanism through suitable movement of the valve 167. When the pad is rotated in a counterclockwise direction from the position shown in Fig. 7, the valve member 167 is moved to an operative position in which the recess 171 bridges the openings 169 and 170 and thus connects the interior of the cylinder 155 with the source of suction. The suction, acting upon the piston 156, causes the latter to approach the closed end of the cylinder 155 and, acting through the link 157, lever arm 158, shaft 159, lever arm 160 and link 161, moves the foot pedal 146 towards the brake-applying position. The braking power developed by the suction in the above manner may be augmented by manually pressing the brake pedal forwardly until the pad 172 is held in its tilted position. When the brake pedal is released and the pad is rotated to its initial position, the brake pedal is returned to its normal rearward position partially by the pressure in the system and partially by a spring 177 which is secured at one end to the frame of the chassis 140 and at its other end to the lever 158. The return movement of the pad 172 shifts the valve 167 bringing the recess 171 thereof into registration with the openings 168 and 169, thereby admitting air from the atmosphere into the cylinder 155.

In order to prevent an excessive application of the booster mechanism to the brake, and thereby to control the amount of force exerted by the booster mechanism relative to the position of the brake pedal, the following mechanism is provided. A small housing 180 is connected into the suction line between the cylinder 155 and the intake manifold 31. Preferably, this housing is disposed in the suction line 163 at a point adjacent the intake manifold 31 so that the action of the valve means disposed therein will be quick and constant. This housing is provided with an opening 181 leading to the atmosphere, and between the opening 181 and the point of entrance of the suction line 163 into the housing, a valve seat 182 is formed. A valve 183 is adapted to rest against the seat 182 and is provided with an upwardly extending stem 184. Adjacent its top the stem is provided with a collar 185 secured against relative axial movement to the stem and against which a washer 186 bears. A coil spring 187 encircles the stem 184 and is held under compression between the washer 186 and a second washer 188 encircling the stem 184 and axially slidable thereon. The compression of this spring 187 controls the point at which the suction within the tube 163 will cause the valve 183 to open, and that when the valve 183 opens, air will be drawn into the housing through the opening 181 and thereby prevent a higher degree of suction from being built up in the tube 163, and consequently will limit the suction that may be applied to the cylinder 155.

The tension of the spring 187 is controlled in accordance with the depression of the pedal 146 in the following manner. A bracket 189 is formed on the housing 180 and has pivotally connected thereto by means of a pin 190, a bell crank having a horizontally extending arm 191 and a vertically extending arm 192. The free end of the arm 191 is provided with an upper curved face and is formed so as to receive the stem 184 within it, the upper curved face serving as a stop for limiting the downward movement of the washer 188 of the valve stem 184. The free end of the vertically extending arm 192 of the bell crank is connected by means of a rod 193 to the end of a downwardly extending arm 178 of the pedal 146. The rod 193 preferably includes a turn buckle 194 for adjustably controlling the effective length of the rod 193. It will be apparent that in this construction, the farther the pedal 146 is depressed, the higher the washer 188 will be moved on the stem 184 and consequently the greater will be the compression of the spring 187 and, accordingly, a greater degree of suction will be permitted to be built up in the suction line 163. Thus, by suitably controlling the depression of the pedal 146 by the foot, the operator of the vehicle may control the amount of force which the booster may exert upon the vehicle brake and, consequently, will be able to control the amount of braking action of the vehicle.

It is also desirable that means operable in response to pressures within the hydraulic system is provided whereby excessive pressure within the hydraulic system will cause the admission of air to the suction system of the booster mechanism to relieve the application of the booster mechanism to the brakes. It is also desired that the pressure within the hydraulic system which will cause such admission of air vary in accordance with the pedal depression. To this end, a housing 195 is provided, the interior of which is connected to the tube 196 to the interior of the tube 148 in which the fluid employed in the brake actuating mechanism is enclosed. The housing 195 is provided with an open end through which is inserted an expansible and contractible member 197, preferably of the metallic bellows type, as illustrated. This bellows is provided with an outwardly extending flange 198 at its open end, which is clamped to the housing 195 through a clamping ring 199, and thereby acts to seal the open end of the housing 195. The closed end of the bellows 197 is provided with a downwardly depending stem 200 which terminates in normally spaced but adjacent relationship with respect to the collar 185 provided on the stem 184 of valve 183.

In the above construction it will be apparent that the forces tending to move the valve 183 downwardly and thereby admit air in the vacuum system of the booster mechanism will be the degree of vacuum obtained in the suction line 163 and the pressure developed within the pressure line 148 of the hydraulic braking system. The forces tending to oppose the opening of valve 183 will be the spring 187, the compression of which varies in accordance with the depression of pedal 146 and the tendency of the metallic bellows 197 to remain in extended position due to atmospheric pressure within its inner surface and the inherent tendency of the metallic bellows 197 to remain in extended position. Thus, to open the valve 183, the suction within the line 163 must attain a sufficient value, or the pressure within the fluid pressure line 148 must reach a certain value, or both, in order to overcome the compression of spring 187 conditioned in compression in accordance with the depression of pedal 146. The compression of spring 187, as previously pointed out, may be adjustably varied by means of a turn buckle 194.

It is also desired to provide in the present embodiment, means for limiting the maximum available braking effort that may be applied by the booster mechanism, and such means is made adjustable and readily controllable by the driver from his normal driving position. To this end, a suction operated valve is connected by conduit 201 to the suction line 163 at a point relatively close to the intake manifold 31. A check valve 87 is interposed between the connection of conduit 201 and conduit 163 to maintain the vacuum within the suction line of the booster mechanism at values corresponding to the higher degrees of vacuum developed within the intake manifold 31. The construction of the suction operated valve may be the same as that disclosed relative to the previously described embodiment as shown in detail in Fig. 3. The limiting degree of the vacuum at which air will be admitted to the suction line of the booster mechanism and the application of the booster mechanism to the brakes released, is again under the control of the adjusting handle 75, readily accessible to the operator of the vehicle, and determined by the point to which this control handle is rotated.

As many changes could be made in the above constructions and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a vehicle brake system, in combination, a suction operated brake applying mechanism, a source of suction connected to said brake applying mechanism by means of a suction line, a pedal connected to said mechanism for manually operating the same, a valve in communication with said line for limiting the degree of suction which may be applied to said brake applying mechanism, a stem on said valve, an abutment slidably mounted on said stem, a second abutment on said stem fixed against movement in one direction, a spring mounted on said stem and interposed between said abutments, yieldable means for moving the first-mentioned abutment on said stem against the action of said spring, a movement of the first-mentioned abutment against the action of the spring varying according to the movement of said pedal, a valve communicating with said suction line and operable independently of movement of said pedal for limiting the degree of suction obtainable in said line, and check valve means interposed in said line adjacent said source of suction and said source and said valves for maintaining higher values of suction from said source in said line.

2. In a vehicle brake system, in combination, a suction operated brake applying mechanism, a source of suction connected to said brake applying mechanism by means of a suction line, means including a movable valve means for limiting the degree of suction which may be applied to said brake applying mechanism, spring means constantly urging said valve means toward one extremity of its movable position, a movable pedal, a cam connected to said pedal for simultaneous movement therewith, a yieldable member cooperating with said cam, an abutment for said spring controlled at least in part by said member, a second valve communicating with said suction line adjacent said source of suction for limiting the degree of suction obtainable in said line independently of movement of said pedal.

3. In a vehicle brake system, in combination, a suction operated brake applying mechanism, a source of suction connected to said brake applying mechanism by means of a suction line, a valve for limiting the degree of suction which may be applied to said brake applying mechanism, biasing means constantly urging said valve toward one extremity of its movable position, a movable pedal, a cam adjustably connected to said pedal for simultaneous movement therewith, manual means for adjusting said cam relative to said pedal, a yieldable member cooperating with said cam, an abutment for said spring controlled at least in part by said member, a second valve communicating with said suction line for limiting the degree of suction obtainable therein independently of movement of said pedal, said valves communicating with said suction line at points close to said source of suction, and check valve means interposed in said suction line adjacent the source of suction and between said valves and said source.

4. In a fluid pressure brake operating system for motor vehicles, a fluid pressure actuated brake applying element, a source of differential of fluid pressure connected with said element by means of a conduit, a brake lever, a valve in communication with said conduit adjacent said source for controlling the transmittal of pressure therethrough, means carried by said lever for moving said valve, a second valve in said conduit, biasing means engaging said second valve for further controlling the transmittal of pressure through said conduit, a cam adjustably mounted relative to said lever, means for securing said cam in one of a plurality of adjusted positions, a yieldable connection between said cam and biasing means, and a third valve communicating with said conduit adjacent said source for further controlling the transmittal of pressure to the conduit independently of movement of said lever.

5. A brake system for an automotive vehicle comprising brakes for the individual wheels, means actuated by differential of fluid pressures for actuating the brakes, a valve for controlling the effective pressure exerted, a brake pedal, means mechanically interconnecting the brake pedal and the brake, cam means secured to the brake pedal and being angularly adjustable with respect to the pedal and further being operatively connected to the valve whereby to control the intensity of the fluid pressure exerted upon the fluid pressure actuated means and adjustable means for limiting independently of movement of the brake pedal, the effectiveness of the valve in order to prevent the development of differentials of pressure in the fluid pressure operated means in excess of a predetermined value, said last-named means being adjustable by the driver of the vehicle.

6. In a vehicle brake mechanism, a suction operated brake applying element, a source of suction connected thereto, a manually operable brake lever, means operable by said lever for variably limiting substantially in proportion to the extent that the lever is operated the degree of suction which may be built up in said element, said means including means interposed between said lever and said suction limiting means and adjustable with respect to said lever for varying the effect of depression of the lever on said suction limiting means, and manually controllable means independent of said first-named means for variably limiting the degree of suction which may be built up in said element.

SAMUEL F. ARBUCKLE.